(12) United States Patent
Onishi et al.

(10) Patent No.: US 8,794,646 B1
(45) Date of Patent: Aug. 5, 2014

(54) VEHICLE STRUCTURE

(71) Applicants: Koji Onishi, Shizuoka-ken (JP);
Tomoyuki Honsho, Numazu (JP)

(72) Inventors: Koji Onishi, Shizuoka-ken (JP);
Tomoyuki Honsho, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/157,135

(22) Filed: Jan. 16, 2014

(30) Foreign Application Priority Data

Jan. 21, 2013 (JP) ................................ 2013-008597

(51) Int. Cl.
*B62D 21/02* (2006.01)
(52) U.S. Cl.
USPC ............... 280/124.109; 280/784; 296/203.01; 296/203.02; 296/203.03; 296/204
(58) Field of Classification Search
USPC .......... 280/784, 124.109; 296/193.09, 203.01, 296/203.02, 203.03, 204
See application file for complete search history.

(56) References Cited

U.S. PATENT DOCUMENTS

| | | | |
|---|---|---|---|
| 6,390,224 B1 * | 5/2002 | Yoshida ........................ 180/312 |
| 6,869,090 B2 * | 3/2005 | Tatsumi et al. ......... 280/124.109 |
| 7,380,829 B2 * | 6/2008 | Kishima ........................ 280/781 |
| 7,654,543 B2 * | 2/2010 | Tanaka et al. ......... 280/124.109 |
| 7,883,113 B2 * | 2/2011 | Yatsuda ........................ 280/784 |
| 8,267,429 B2 * | 9/2012 | Takeshita et al. .............. 280/784 |
| 8,480,102 B2 * | 7/2013 | Yamada et al. ......... 280/124.109 |
| 8,490,988 B2 * | 7/2013 | Takeshita et al. ...... 280/124.109 |
| 8,511,696 B2 * | 8/2013 | Tanaka et al. ......... 280/124.109 |
| 8,540,261 B2 * | 9/2013 | Okamoto ............... 280/124.134 |
| 8,579,309 B1 * | 11/2013 | Gagliano ............... 280/124.109 |
| 2011/0316295 A1 * | 12/2011 | Yamada et al. ............... 293/132 |
| 2012/0049571 A1 | 3/2012 | Katou et al. |

FOREIGN PATENT DOCUMENTS

| | | |
|---|---|---|
| JP | 2006-240325 A | 9/2006 |
| JP | 2012-045995 A | 3/2012 |
| JP | 2013-151225 A | 8/2013 |

* cited by examiner

*Primary Examiner* — Toan To
(74) *Attorney, Agent, or Firm* — Gifford, Krass, Sprinkle, Anderson & Citkowski, P.C.

(57) ABSTRACT

A vehicle structure includes: a suspension member for supporting a suspension mechanism of a vehicle; a rear-portion support member (inner members, a dash panel) provided above a rear portion of the suspension member and supporting the suspension member; a fastening member for fastening the rear portion of the suspension member to the rear-portion support member; and a latching member provided in the fastening member and latching thereto the rear portion of the suspension member to be displaced in a vehicle lower direction due to an impact load toward a vehicle rearward direction, so as to transmit, to the fastening member, a load toward the vehicle lower direction.

5 Claims, 6 Drawing Sheets

VEHICLE STRUCTURE

INCORPORATION BY REFERENCE

The disclosure of Japanese Patent Application No. 2013-008597 filed on Jan. 21, 2013 including the specification, drawings and abstract is incorporated herein by reference in its entirety.

BACKGROUND OF THE INVENTION

1. Field of the Invention

The invention relates to a vehicle structure, more particularly to a structure for fastening a suspension member in a vehicle front portion.

2. Description of Related Art

As a vehicle structure, Japanese Patent Application Publication No. 2012-45995 (JP2012-45995 A) describes a structure in which a rear end portion of a suspension member is provided close to a dash panel so as to facilitate a bending rotation of the suspension member at the time of a vehicle crash.

However, in such a vehicle structure, such a problem is assumed that the rear end portion of the suspension member digs deep into the dash panel at the time of the vehicle crash so that the dash panel is largely deformed, thereby preventing the suspension member from separating from the vehicle.

SUMMARY OF THE INVENTION

In view of this, an object of the invention is to provide a vehicle structure that is able to facilitate removal of a suspension member at the time of a vehicle crash.

A vehicle structure according to one aspect of the invention includes: a suspension member for supporting a suspension mechanism of a vehicle; a rear-portion support member provided above a rear portion of the suspension member and supporting the suspension member; a fastening member for fastening the rear portion of the suspension member to the rear-portion support member; and a latching member provided in the fastening member and latching thereto the rear portion of the suspension member to be displaced in a vehicle lower direction due to an impact load toward a vehicle rearward direction, so as to transmit, to the fastening member, a load toward the vehicle lower direction.

According to the vehicle structure of the invention, the suspension member rotates in the vehicle lower direction with a contact portion thereof with the rear-portion support member being taken as a supporting point, due to the impact load toward the vehicle rearward direction. Then, due to latching between the latching member and the rear portion of the suspension member that is displaced in the vehicle lower direction, the load toward the vehicle lower direction is transmitted to the fastening member. Hereby, the impact load toward the vehicle rearward direction and the load toward the vehicle lower direction are efficiently transmitted to the fastening member. As a result, breakage of the rear-portion support member is facilitated, thereby separating the suspension member from the rear-portion support member.

According to the aspect of the invention, it is possible to provide a vehicle structure that is able to facilitate separating a suspension member at the time of a vehicle crash.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The following specifically describes a vehicle structure according to an embodiment of the invention with reference to the attached drawings. Note that the same elements in the description of the drawings have the same reference sign and redundant description thereof is omitted.

Figure 1:
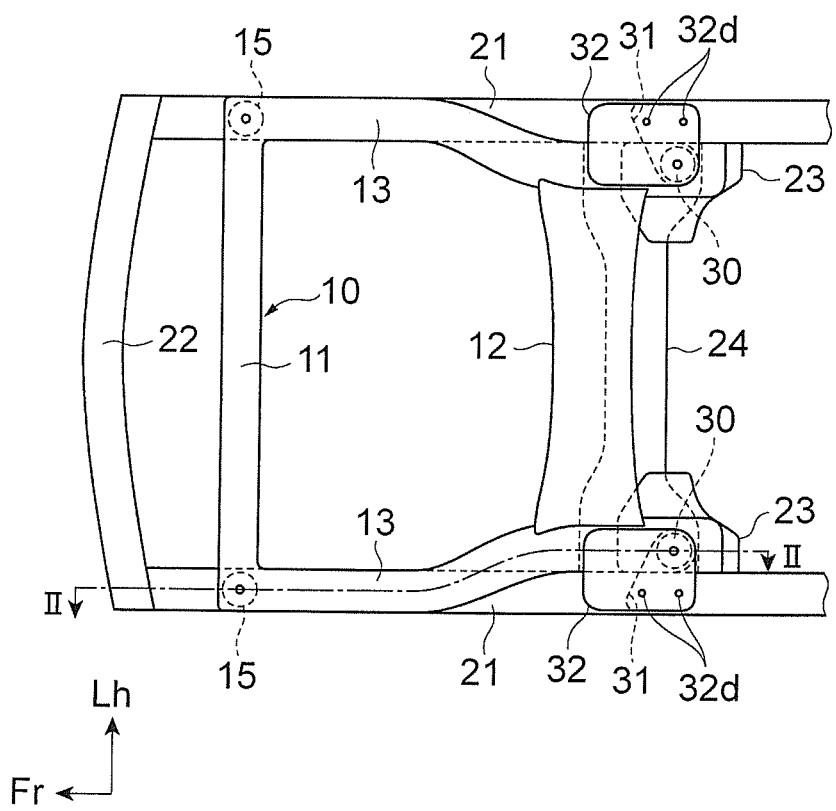
FIG. 1 is a bottom plan view illustrating a fastening structure of a suspension member in a vehicle front portion.
Figure 2:
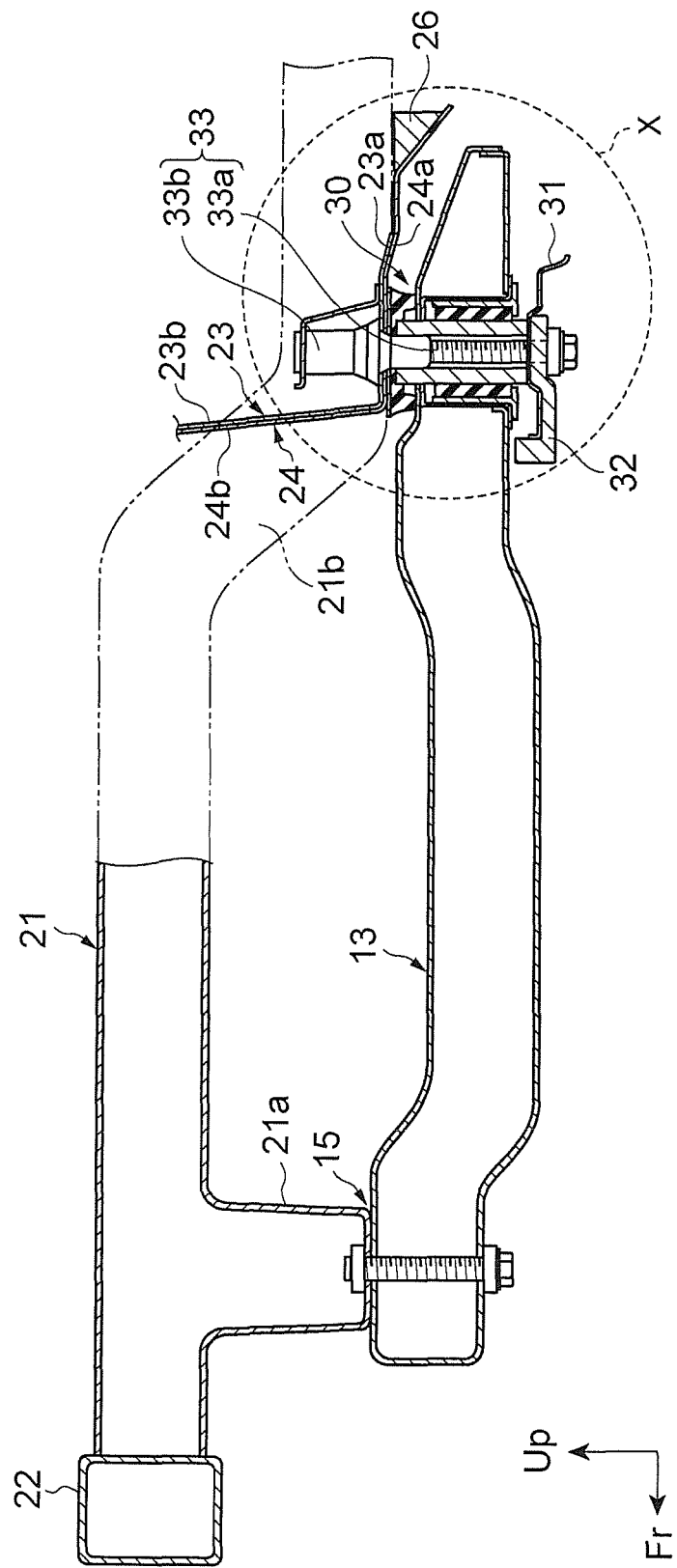
FIG. 2 is a sectional view taken along a line II-II in FIG. 1.
Figure 3:
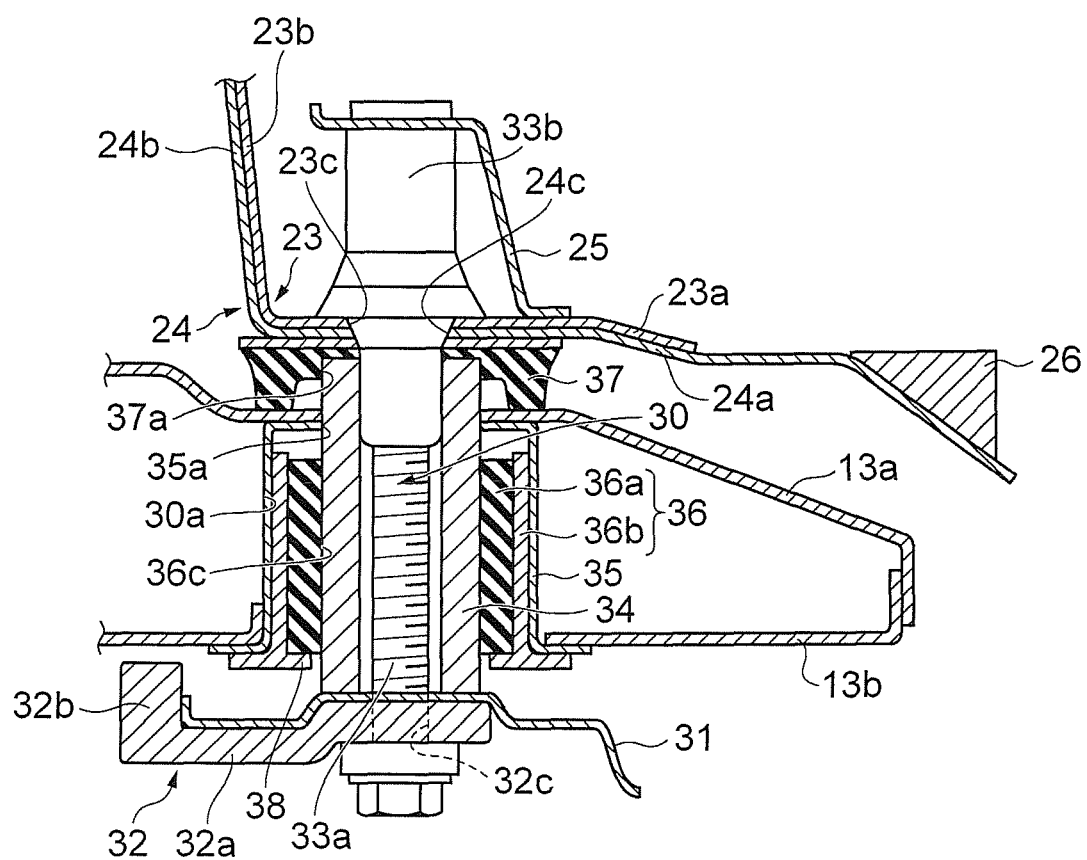
FIG. 3 is a partial sectional view enlarging a part X in FIG. 2.

Initially described is a configuration of the vehicle structure according to the embodiment of the invention with reference to FIGS. 1 to 3. FIG. 1 is a bottom plan view illustrating a structure for fastening a suspension member 10 in a vehicle front portion.

FIG. 2 is a sectional view taken along a line II-II in FIG. 1. Note that, in FIGS. 1 and 2, an arrow Fr indicates a vehicle front side, an arrow Lh indicates a vehicle left side, and an arrow Up indicates a vehicle upper side.

As illustrated in FIGS. 1 and 2, in the vehicle front portion, the suspension member 10 for supporting a suspension mechanism of a vehicle is provided. Above the suspension member 10 (on a depth side in FIG. 1), right and left front side members 21, 21 are provided so as to extend in a vehicle longitudinal direction, and front end portions of the right and left front side members 21, 21 are connected to rear sides of respective end portions of a front bumper reinforcement 22 provided so as to extend in a vehicle width direction. Above a rear portion of the suspension member 10, base plates 23a, 23a of right and left inner members 23, 23 and a base plate 24a of a dash panel 24 are provided as a rear-portion support member for supporting the suspension member 10.

As illustrated in FIG. 1, the suspension member 10 has, for example, a trapezoid frame shape in a plane view, and is configured such that a front member 11, a rear member 12, and right and left side members 13, 13 are connected to each other. The front member 11 is provided so as to extend in the vehicle width direction with approximately the same length as a distance between the right and left front side members 21, 21. The rear member 12 is provided so as to extend in the vehicle width direction with a length shorter than the front member 11. The side members 13, 13 are provided so as to extend in the vehicle longitudinal direction from respective end portions of the front member 11 toward respective end portions of the rear member 12. The side members 13, 13 are linear from their front portions to their central portions, and curved inwardly in the vehicle width direction from their central portions to their rear portions. An engine for the vehicle, for example, is provided in the suspension member 10.

In right and left front portions of the suspension member 10, fastening portions 15, 15 to be fastened to the front side members 21 are provided. In right and left rear portions of the suspension member 10, fastening portions 30, 30 to be fastened to the rear-portion support member 23, 24 are provided. On a bottom face of the fastening portion 30, a brace 31 and a latching member 32 to be attached to a bottom face of the suspension member 10 are fastened.

A front portion of the front side member 21 is provided with a downward projecting portion 21a to which the front portion of the suspension member 10 is fastened. In a central portion of the front side member 21, a downward crank portion 21b is provided at a position in the vehicle longitudinal direction which position corresponds to the rear portion of the suspension member 10. The fastening portion 30 of the suspension member 10 is provided at a part corresponding to the crank portion 21b in the vehicle longitudinal direction.

The base plates 23a of the inner members 23 are provided in an island shape so as to be adjacent to the right and left fastening portions 30, 30 and the front side members 21. The base plate 24a of the dash panel 24 is provided so as to extend in the vehicle width direction over the right and left fastening portions 30, 30. The inner members 23 and the dash panel 24 are respectively provided with front plates 23b, 24b provided so as to extend in a vehicle up-and-down direction from a position closer to a vehicle front direction than the fastening portions 30, 30.

FIG. 3 is a partial sectional view enlarging a part X in FIG. 2. As illustrated in FIG. 3, the rear portion of the suspension member 10 is provided with a fastening member 33 for fastening the rear portion of the suspension member 10 to the rear-portion support member 23, 24. The fastening member 33 is constituted by a combination of a bolt 33a and a nut 33b, for example. A screw shank of the fastening member 33 is surrounded by a tubular collar 34.

The suspension member 10 around the fastening portion 30 has a rectangular section in combination of a top plate 13a and a bottom plate 13b. The fastening portion 30 is provided with a through hole 30a having a diameter larger than a shaft diameter of the fastening member 33. A hat-shaped holder 35 is provided inside the through hole 30a, and a tubular buffer member 36 is provided inside the holder 35. As the buffer member 36, a rubber bush or the like is used. The buffer member 36 is constituted by a rubber portion 36a and a base plate portion 36b, for example. A top of the holder 35 and the buffer member 36 are provided with insertion holes 35a, 36c having approximately the same diameter as a shaft diameter of the collar 34.

The rear-portion support member 23, 24 is a plate-like member. The rear-portion support member 23, 24 is provided with insertion holes 23c, 24c having approximately the same diameter as the shaft diameter of the fastening member 33 at a position corresponding to the fastening portion 30. In vicinity to the insertion holes 23c, 24c, a reinforcing member 25 for reinforcing sectional breakage caused due to the formation of the insertion holes 23c, 24c is provided. Between the fastening portion 30 and the rear-portion support member 23, 24, an annular buffer member 37 having approximately the same diameter as the through hole 30a of the fastening portion 30 is provided. As the buffer member 37, a rubber bush or the like is used. The buffer member 37 is provided with an insertion hole 37a having approximately the same diameter as the shaft diameter of the collar 34.

In vicinity to the fastening portion 30, a reinforcing member 26 is provided so as to be close to or make contact with a rearward of the rear portion of the suspension member 10. The reinforcing member 26 is provided on a top face of the dash panel 24 at a position having approximately the same height as the rear portion of the suspension member 10. The reinforcing member 26 is constituted as a steel sheet placed in a rib shape on the top face of the dash panel 24, for example.

Further, a protruding portion 38 that projects toward the fastening member 33 is provided inside the holder 35. The protruding portion 38 is provided closer to a vehicle front side than the fastening portion 30 in proximity to the bottom face of the suspension member 10, in particular. As illustrated in FIG. 3, the protruding portion 38 may be provided as part of the buffer member 36, particularly as part of the hard base plate portion 36b, or may be provided as a member different from the buffer member 36.

Further, in a lower end portion of the fastening member 33, a latching member 32 for latching the rear portion of the suspension member 10 to be displaced in a vehicle lower direction due to an impact load toward a vehicle rearward direction so as to transmit, to the fastening member 33, a load toward the vehicle lower direction is provided. The latching member 32, which is a plate-like member, is provided with a flat plate portion 32a and a protruding portion 32b that projects upward from the flat plate portion 32a.

The flat plate portion 32a is provided with an insertion hole 32c having approximately the same diameter as the shaft diameter of the fastening member 33, and bolt holes 32d (see FIG. 1). The latching member 32 is fastened to the brace 31 and a bottom face of the fastening portion 30, and is fastened with bolts to a bottom face of the front side member 21.

The latching member 32 is provided on a bottom side of the suspension member 10 so as to extend closer to the vehicle front direction than a lower end portion of the fastening member 33, that is, a head of the bolt. An end portion of the latching member 32 in the vehicle front direction is provided with the protruding portion 32b that projects toward the bottom side of the suspension member 10. A top face of the protruding portion 32b is provided so as to be close to or make contact with the bottom face of the suspension member 10.

Figure 4:
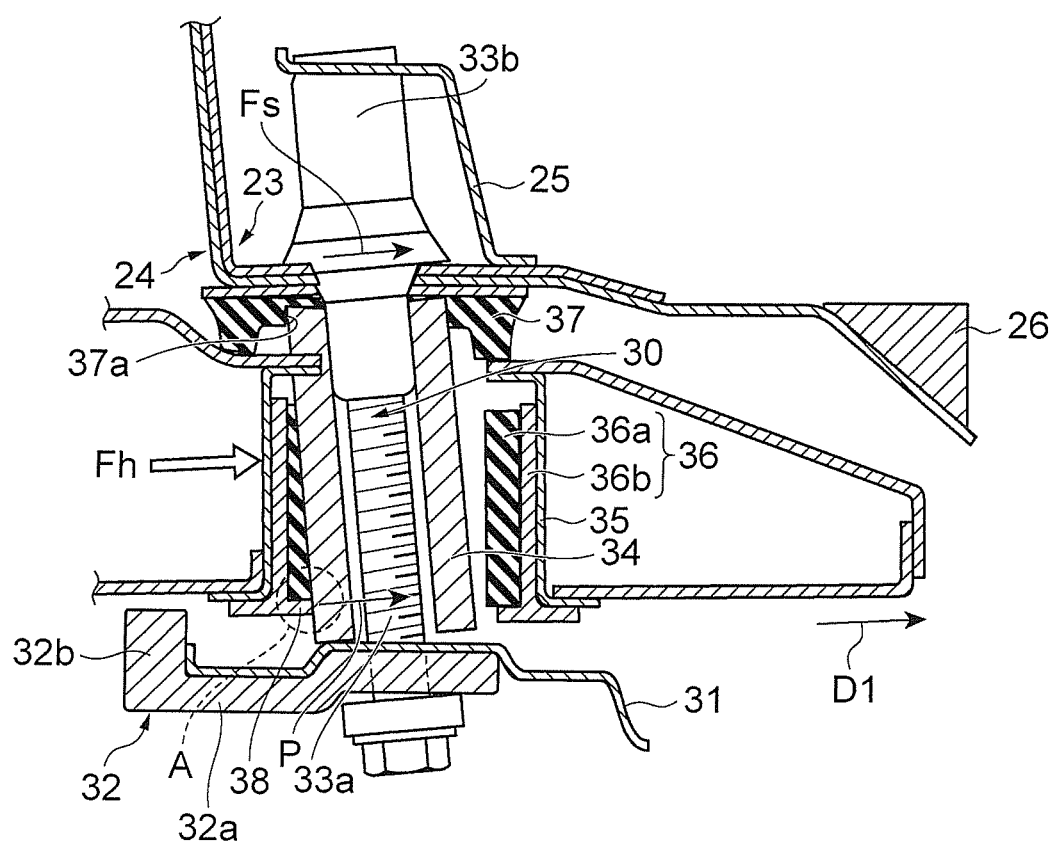
FIG. 4 is a view (1/3) illustrating a removal state of the suspension member at the time of a frontal crash of a vehicle, according to time sequence.
Figure 5:
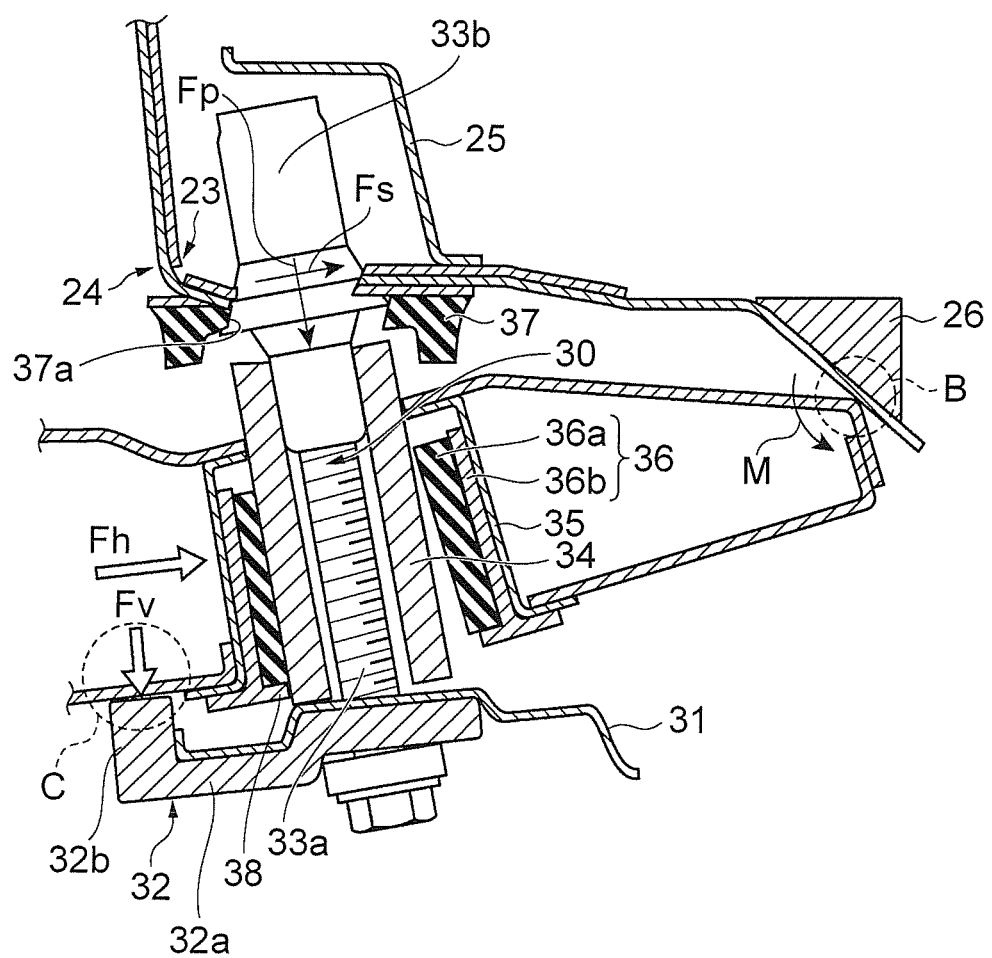
FIG. 5 is a view (2/3) illustrating the removal state of the suspension member at the time of the frontal crash of the vehicle, according to time sequence.
Figure 6:
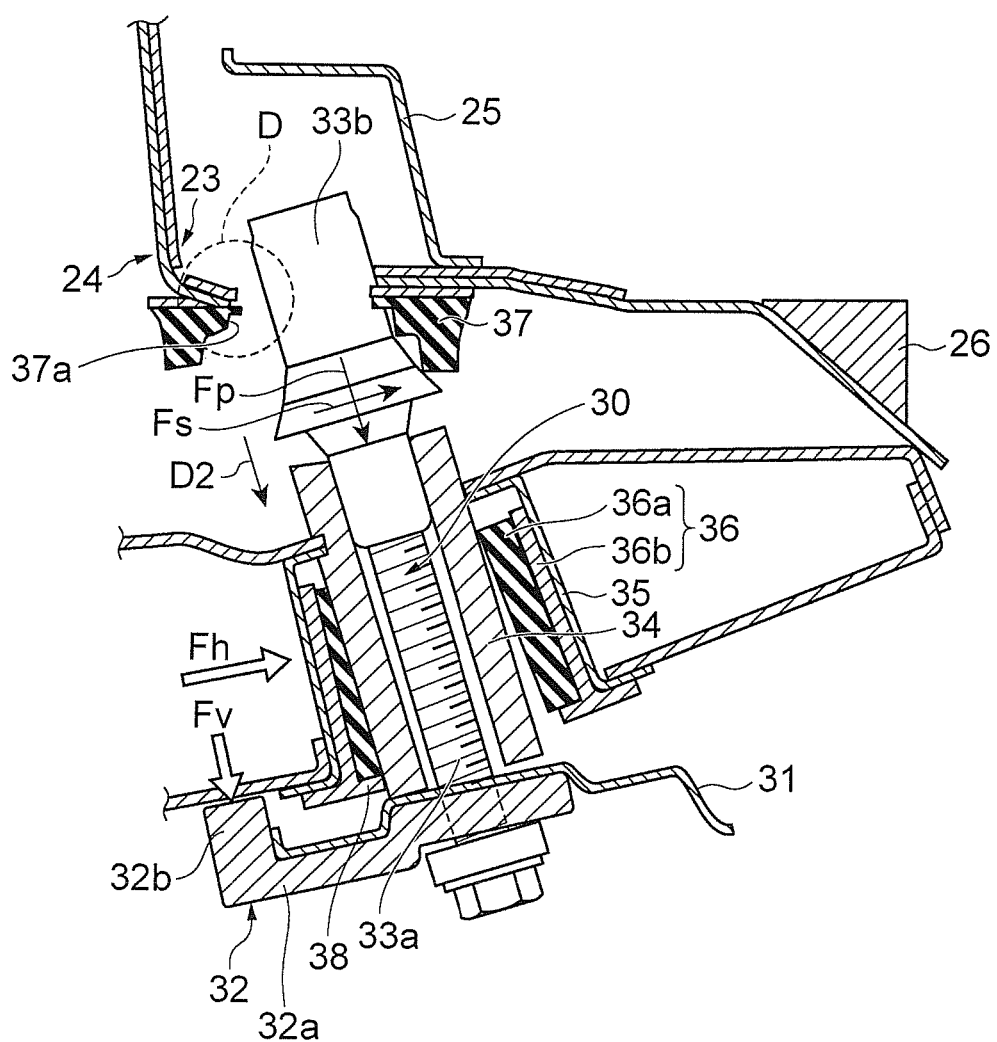
FIG. 6 is a view (3/3) illustrating the removal state of the suspension member at the time of the frontal crash of the vehicle, according to time sequence.

Next will be described a behavior of the vehicle structure at the time of a frontal crash of the vehicle, with reference to FIGS. 4 to 6. FIGS. 4 to 6 are views illustrating a removal state of the suspension member 10 at the time of the frontal crash of the vehicle, according to time sequence.

In the state illustrated in FIG. 4, that impact load Fh toward the vehicle rearward direction which is input into the front side member 21 and the suspension member 10 acts on the fastening portion 30. Due to the impact load Fh toward the vehicle rearward direction, the protruding portion 38 abuts with the collar 34 (a part A), so as to press a lower portion of the fastening member 33 in a vehicle rearward direction P. While the suspension member 10 maintains its fastening state, the suspension member 10 is displaced to a vehicle rearward direction D1 due to pressing by the fastening member 33. Hereby, a shear force Fs toward the vehicle rearward direction acts on the fastening member 33 at a contact portion thereof with the rear-portion support member 23, 24.

In the state illustrated in FIG. 5, the rear portion of the suspension member 10 abuts with the reinforcing member 26 provided on the dash panel 24, due to the displacement of the suspension member 10 to the vehicle rearward direction D1 (a part B). Although not illustrated herein, the central portion of the suspension member 10 is bent in a V shape in the vehicle lower direction due to a rotation thereof. While the suspension member 10 maintains its fastening state, the suspension member 10 rotates in the vehicle lower direction (an M direction) with a contact portion of the rear portion thereof with the reinforcing member 26 being taken as a supporting point. Due to the rotation of the suspension member 10, the bottom face of the suspension member 10 abuts with the protruding portion 32b of the latching member 32 (a part C). Then, due to latching (or contact) between the latching member 32 and the rear portion of the suspension member 10 that is displaced in the vehicle lower direction, a load Fv toward the vehicle lower direction is transmitted to the fastening member 33. Hereby, a pulling force Fp toward the vehicle lower direction acts on the fastening member 33 at the contact portion thereof with the rear-portion support member 23, 24.

In the state illustrated in FIG. 6, the impact load Fh toward the vehicle rearward direction and the load Fv toward the vehicle lower direction are efficiently transmitted to the fastening member 33, so that the rear-portion support member 23, 24 is broken (a part D), thereby resulting in that the suspension member 10 is separated from the rear-portion support member 23, 24 in a vehicle lower direction D2. This restrains that the rear portion of the suspension member 10 largely deforms the dash panel 24, thereby restraining preventing the suspension member 10 from the vehicle.

As described above, according to the vehicle structure according to the embodiment of the invention, the suspension member rotates in the vehicle lower direction with the contact portion thereof with the rear-portion support member being taken as a supporting point, due to the impact load toward the vehicle rearward direction. Then, due to latching between the latching member and the rear portion of the suspension member that is displaced in the vehicle lower direction, the load toward the vehicle lower direction is transmitted to the fastening member. Hereby, the impact load toward the vehicle rearward direction and the load toward the vehicle lower direction are efficiently transmitted to the fastening member. As a result, breakage of the rear-portion support member is facilitated, thereby facilitating removal of the suspension member from the rear-portion support member.

Consequently, in a case where an engine is provided in the suspension member, the engine is facilitated to move in the vehicle lower direction due to the removal of the suspension member, thereby making it possible to restrain the engine from coming into a cabin.

Further, the latching member is provided on the bottom side of the suspension member so as to extend closer to the vehicle front direction than the lower end portion of the fastening member. The latching member makes it possible to surely latch the rear portion of the suspension member that rotates in the vehicle lower direction with the contact portion thereof with the rear-portion support member being taken as a supporting point, which rear-portion support member is provided closer to the vehicle rearward direction than the fastening member.

Further, the end portion of the latching member in the vehicle front direction is provided with the protruding portion that projects toward the bottom side of the suspension member. This ensures a moment length between the protruding portion serving as a load input point and the fastening member, thereby making it possible to efficiently transmit, to the fastening member, the load toward the vehicle lower direction.

Further, since the reinforcing member is provided so as to be close to or make contact with a rearward of the rear portion of the suspension member, it is possible to ensure a hinged support to be used for the rotation of the suspension member.

Note that the above embodiment describes an optimum embodiment of the vehicle structure according to the invention, and the vehicle structure according to the invention is not limited to the vehicle structure as described in the present embodiment. The vehicle structure according to the invention may be a vehicle structure obtained by modifying the vehicle structure according to the present embodiment without departing from a gist of the invention described in each claim, or a vehicle structure obtained by applying, to others, the vehicle structure according to the present embodiment without departing from the gist of the invention described in each claim.

For example, the description of the above embodiment deals with a case where the rear-portion support member is constituted by the inner members 23 and the dash panel 24. However, the rear-portion support member may be constituted by the inner members 23 or the dash panel 24, may be constituted by a vehicle-body frame member such as the front side members 21, or may be constituted as a combination thereof.

The latching member 32 mentioned in the embodiment, may merely make contact with or abut the rear portion of the suspension member 10. Thus, the latching member may be regarded as an abutting member or a contacting member.

What is claimed is:

1. A vehicle structure comprising:
   a suspension member for supporting a suspension mechanism of a vehicle;
   a rear-portion support member provided above a rear portion of the suspension member and supporting the suspension member;
   a fastening member for fastening the rear portion of the suspension member to the rear-portion support member; and
   a latching member provided in the fastening member and latching thereto the rear portion of the suspension member to be displaced in a vehicle lower direction due to an impact load toward a vehicle rearward direction, so as to transmit, to the fastening member, a load toward the vehicle lower direction.

2. The vehicle structure according to claim 1, wherein:
   the latching member is provided on a bottom side of the suspension member so as to extend closer to a vehicle front direction than a lower end portion of the fastening member.

3. The vehicle structure according to claim 2, wherein:
   an end portion of the latching member in the vehicle front direction is provided with a protruding portion that protrudes toward the bottom side of the suspension member.

4. The vehicle structure according to claim 1, further comprising:
   a reinforcing member provided so as to be close to or make contact with a rearward of the rear portion of the suspension member.

5. The vehicle structure according to claim 1, wherein:
   the rear-portion support member is constituted by inner members and a dash panel.

* * * * *